United States Patent Office 3,142,461
Patented July 28, 1964

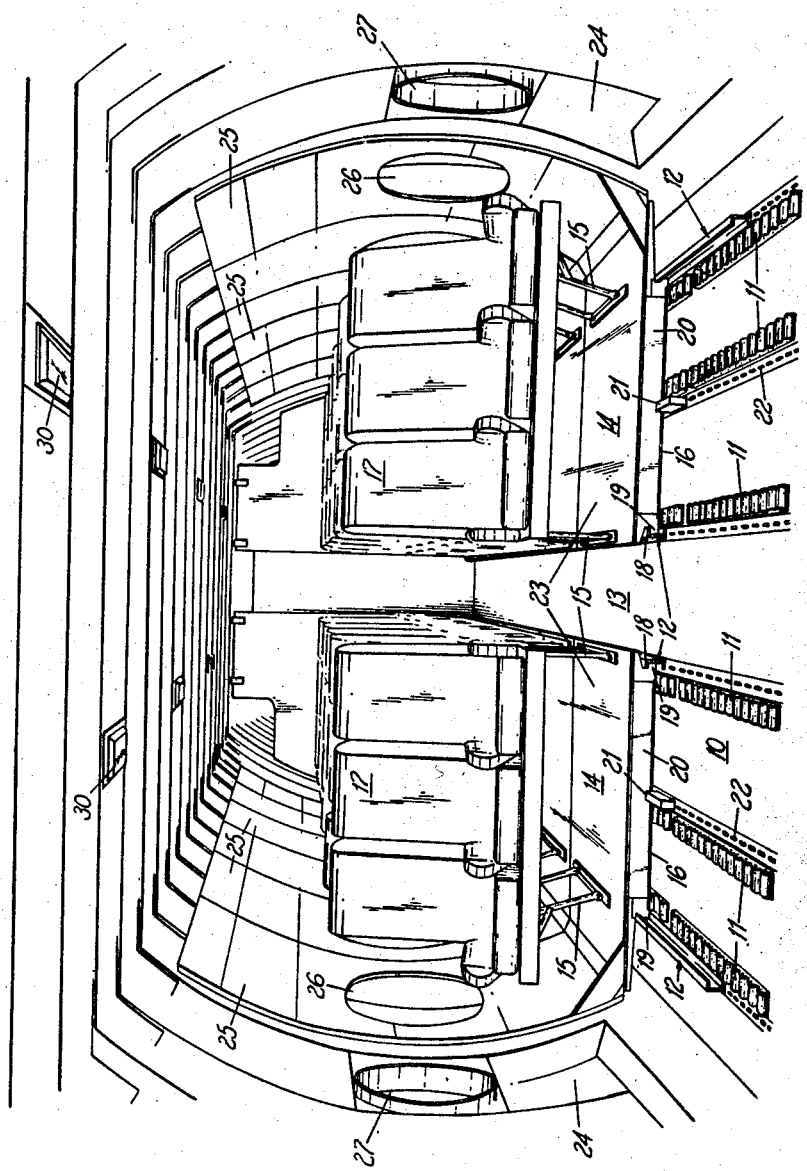

3,142,461
INTERNAL FITTINGS OF AIRCRAFT
Leonard Tomlinson Naylor, Leamington Spa, England, assignor to A.T.S. Company Limited, London, England, a British company
Filed May 23, 1961, Ser. No. 152,369
Claims priority, application Great Britain May 26, 1960
2 Claims. (Cl. 244—137)

This invention relates to the internal fittings of aircraft. More particularly, it is concerned with aircraft passenger seating arrangements.

In the general field of air transport the need is sometimes for the carriage of freight and sometimes for the conveyance of passengers, and it is a convenience to be able to adapt an aircraft internally for freight carrying or passenger carrying as occasion demands. An object of this invention is to provide means whereby the conversion from freight to passenger carrying, and vice versa, can be made rapidly and simply.

According to the present invention there is provided a freighter aircraft, in combination with a plurality of removable passenger-seating units each comprising a pallet bearing one or more seats, which units are such that they can be introduced into the freight compartment of the aircraft and arranged in positions therein at which the seats are appropriately placed for passenger-carrying with the pallets constituting false floor sections under the seats, the combination including means for releasably anchoring the pallets in those positions against movement in the aircraft.

Preferably, each of the seating units comprises, on at least one side, a wall panel upstanding from the pallet to lie close up to and follow the contour of the side wall of the aircraft compartment. It is possible also to fit each unit with a ceiling panel above the seat or seats. When the units are in position in the aircraft, the wall panels, and also the ceiling panels if provided, may abut edge to edge to form a continuous wall surface, and in the case of ceiling panels a continuous false ceiling. Each seating unit can be furnished with a suitable floor covering over the upper surface of the pallet, appropriate wall trim, and such other fittings and trimmings as normally appertain to an aircraft passenger compartment, the whole being removable when the units are withdrawn to reconvert the aircraft for the carriage of freight.

In one arrangement there may be guide members on the floor of the aircraft freight compartment to engage the pallets of the seating units for guiding them into the proper positions and also to restrain movement once they are in those positions. A freighter aircraft may have the freight compartment floor equipped with roller conveyors and guide rails to receive freight-bearing pallets, the same conveyors and guide rails being used for the pallets of the seating units to convert the freighter to passenger-carrying duty.

The invention also includes, for use in converting a freighter aircraft to passenger carrying, a seating unit comprising one or more seats fixed down on to a flat-topped pallet adapted to be guided into appropriate position in the freight compartment of an aircraft and anchored in that position against movement in the aircraft compartment.

By way of example, an arrangement in accordance with the invention will now be described with reference to the accompanying drawing, which is a perspective view of an aircraft cabin interior.

Basically, that is to say before any pallet-carried seating is installed, the aircraft cabin interior shown in the drawing is equipped for cargo carrying, having no special floor covering or wall trim but being provided with a substantially flat floor 10 furnished with a number of parallel longitudinally-extending roller conveyors 11. In the example shown there are six such roller conveyors intended normally for employment in two sets of three and providing spaced rows of idler rollers parallel to the fore-and-aft centre line of the cabin to receive two rows of freight-bearing pallets disposed one on each side of a central gangway 13. To guide the pallets and restrain them from lateral movement, channel-section guide rails 12 are provided alongside the outer two of each set of three roller conveyors, these being spaced apart by substantially the width of a pallet. Both the conveyors 11 and the guide rails 12 are in sections bolted to the floor 10 and can be removed if it is desired to clear the floor.

To convert the aircraft for the conveyance of passengers, seat-carrying pallets 14 are run into the aircraft interior in place of freight-bearing pallets. These also lie in rows on either side of the central gangway 13. In the example illustrated each pallet 14 carries a bench-type assembly of three seats 17 side by side with the feet of supporting legs 15 of the seats fastened down in substantially permanent manner to the pallet.

It will be seen that each pallet has a base portion 16 that runs on the three conveyors 11 at that side of the gangway and is a close sliding fit between the associated guide rails 12. Horizontal flanges 18 of the guide rails overlie ledges 19 along the sides of the pallet base portion 16 whereby the rails hold the pallet and the seats it carries against vertical as well as lateral movement. Adjacent ends 20 of the pallets in a row abut one another to form a continuous false floor, and the whole row is held in place longitudinally by end stops 21 secured to the floor 10 of the aircraft compartment in the required positions; the floor 10 has longitudinal rows of holes 22 to permit of the fixing of these stops in different positions.

Each pallet 14 has an upper platform 23 that projects out at one side beyond the base portion 16 so as to reach nearly to the side wall 24 of the aircraft compartment when the pallet is in position therein. Upstanding from the edge of this projecting portion, and secured to the pallet by appropriate brackets, is a wall panel 25 to lie close to the aircraft side wall. This wall panel is curved to suit the aircraft side wall and, in the example illustrated, it has a circular opening 26 to match up with a circular porthole type window 27 in that side wall. The panels 25 of consecutive pallets abut edge to edge to form a continuous wall surface.

The platform of each pallet 14 can be furnished with carpet or any other selected floor covering while the wall panel 25 can be lined with any material appropriate for the interior trim of a passenger compartment, and either or both may incorporate sound-proofing material.

By using seat-bearing pallets of this kind, an aircraft can be converted quickly from a freight-handling role to a passenger-carrying role. All the fittings and trimmings that are required below ceiling level can be carried on the pallet units, and not only does this facilitate a rapid changeover from freight to passenger carrying and vice versa but also it ensures that when the aircraft is being used to carry freight all unnecessary fittings and trim are removed so safeguarding them against damage and giving the maximum amount of cargo space.

Although in the example illustrated the seating units do not include ceiling panels, such panels may be provided if desired, in which case they could be carried from the tops of the side panels 25 and extend horizontally inward above the seats 17. As in the case of the wall panels, when the seating units are in position in the aircraft such ceiling panels would abut edgewise with others in the same row to make up a continuous false ceiling. The ceiling panels, if provided, may extend far enough inward for the panels of the two rows of seating units on opposite sides of the gangway to meet in abutting relationship down the center of the aircraft compartment.

Or alternatively, the ceiling panels on the seating units may engage with a fixed ceiling strip along the center of the compartment. As in the case of the false floor and the wall panels, the ceiling panels may be provided with any desired lining or trim and with such ceiling fittings as may be desirable for the comfort and convenience of aircraft passengers. They can incorporate lighting units, but in general it may be found more convenient to use fixed ceiling lights, such as the lights 30 in the drawing, and provide matching apertures in the false ceiling panels, as this avoids the need to make and unmake electrical connections when the seating units are installed and removed.

The seating units can be arranged to fold down when not in use. Thus, the ceiling panels, when provided, can be arranged to fold or hinge down about their connections to the tops of the wall panels, being held up in position by attachments to the fixed ceiling of the aircraft compartment when the seating units are use in use. This obviates the need to impose a strain on the ceiling and wall panels by supporting the ceiling panel in cantilever fashion from the wall panel. Such folding down provides a more compact unit upon removal from the aircraft compartment. Furthermore, an advantage of the provision of ceiling panels on the units is that they give some measure of protection to the seats and other equipment mounted on the pallet when the units are not in use, and arranging the units to fold down enhances this protection.

Like the false floor and wall panels, the ceiling panels may include sound-proofing material if desired. In the example illustrated, the wall panels have the circular apertures 26 to match the windows 27 of the porthole type but other arrangements are possible and window or ventilator apertures of any desired configuration may be formed in the wall panels, or ceiling panels if provided.

In the arrangement illustrated, the floor of the central gangway 13 is the actual fixed floor of the aircraft freight compartment, the false floor on which the seats are fixed being at somewhat higher level, and in general this arrangement will not be found inconvenient. However, if desired, the pallet platforms 23 can be extended to meet in abutting relationship along the center of the compartment, giving a gangway floor at the same level as the seating floor.

It will be understood that the whole of an aircraft freight compartment need not be converted to passenger carrying on every occasion. It would be possible to carry part passengers and part freight by employing enough seating units to effect a partial conversion. To complete the fitting out of a passenger cabin it is possible to make use of other palletized structures to build up a galley, bar, baggage compartments, and so forth, and to provide one or more transverse partitions for dividing off the aircraft compartment internally.

I claim:

1. In combination, an aircraft cabin with side walls having windows, and having a ceiling and a floor; a plurality of substantially flat-topped pallets with roller-engaging flat undersurfaces to slide into the cabin over the floor; a plurality of roller conveyors secured on the cabin floor and together comprising a plurality of spaced rows of idler rollers parallel to the fore-and-aft center line of the cabin to promote sliding of the pallets along the floor on said idler rollers; pallet guide means secured on the cabin floor and constraining the pallets to slide on said idler rollers only in the direction parallel to the fore-and-aft center line of the cabin, said guide means maintaining each pallet in each row in alignment with the others during said sliding, anchoring means secured on the cabin floor to secure the pallets against bodily shifting with respect to the cabin when the pallets are in position in a row; a number of passenger seats secured down on the top of each pallet so that said seats are disposed side-by-side across the width of the pallet; wall lining panels mounted on the pallets and upstanding from the longitudinal outer edges thereof, each said wall panel conforming with and lying closely adjacent the cabin side wall and extending the full length of the pallet on which it is mounted so that the wall panels on all the pallets in a row will abut to form a substantially continuous wall lining at one side of the cabin; and said wall lining panels being provided with openings therein some at least of which openings lie opposite the windows in the aircraft cabin.

2. The combination according to claim 1, wherein said pallets have ledges along their longitudinal edges, and said pallet guide means comprises longitudinal guide rails having horizontal flanges to overlie said ledges and thereby hold said pallets against vertical movement.

References Cited in the file of this patent

FOREIGN PATENTS

| | | |
|---|---|---|
| 576,505 | Italy | May 7, 1958 |
| 566,915 | Belgium | May 14, 1958 |
| 858,596 | Great Britain | Jan. 11, 1961 |